June 20, 1933.  W. W. LEACH  1,914,642
METHOD AND APPARATUS FOR TREATING STEEL SHEETS
Filed Aug. 19, 1930  8 Sheets-Sheet 1

Fig. 1

INVENTOR.
William W. Leach.
BY Edwin P. Corbett
ATTORNEYS.

June 20, 1933.  W. W. LEACH  1,914,642
METHOD AND APPARATUS FOR TREATING STEEL SHEETS
Filed Aug. 19, 1930  8 Sheets-Sheet 4

Fig. 4

Inventor
William W. Leach.
By 
Attorney

June 20, 1933.  W. W. LEACH  1,914,642

METHOD AND APPARATUS FOR TREATING STEEL SHEETS

Filed Aug. 19, 1930  8 Sheets-Sheet 6

Inventor
William W. Leach.

By Edwin P. Corbett
Attorney

June 20, 1933.  W. W. LEACH  1,914,642
METHOD AND APPARATUS FOR TREATING STEEL SHEETS
Filed Aug. 19, 1930  8 Sheets-Sheet 7

Inventor
William W. Leach.
By
Edwin P. Corbett
Attorney

June 20, 1933. W. W. LEACH 1,914,642
METHOD AND APPARATUS FOR TREATING STEEL SHEETS
Filed Aug. 19, 1930   8 Sheets-Sheet 8

INVENTOR.
William W. Leach.
BY
Edwin P. Corbett
ATTORNEY.

Patented June 20, 1933

1,914,642

UNITED STATES PATENT OFFICE

WILLIAM W. LEACH, OF MANSFIELD, OHIO, ASSIGNOR OF ONE-SIXTH TO FRANCIS A. DAVEY, ONE-SIXTH TO JAMES G. DAVEY AND ONE-SIXTH TO JOHN DAVEY, ALL OF MANSFIELD, OHIO

METHOD AND APPARATUS FOR TREATING STEEL SHEETS

Application filed August 19, 1930. Serial No. 476,273.

My invention relates to method and apparatus for treating steel sheets. It has to do particularly with provision of a novel method and apparatus for normalizing, enameling or heat-treating sheets of steel which is such that a superior product will result.

In the past, the common practice in the art has been to effect this treating of steel sheets by passing them through a furnace in a substantially horizontal position. This has necessitated the use of "dummy" sheets resting horizontally upon sets of rollers disposed at spaced intervals throughout the furnace. In this type of apparatus, it has been necessary to provide water-cooled shafts for the rollers and this has resulted in the production of temperature conditions beneath the sheets different from the temperature conditions above the sheets. The "dummy" sheets used were ordinarily overlapping, with the result that the actual sheets being treated have been subjected to a different temperature above this overlap area than at other areas. Likewise, these "dummy" sheets were used over and over again and ultimately wasted. There are other drawbacks to this prior art process which need not be set forth here in detail.

One of the objects of this invention is to provide a method and apparatus for treating steel sheets of such a nature that these sheets may be subjected to substantially uniform conditions throughout their treatment.

Another object of this invention is to provide a method and apparatus for subjecting sheets of steel to heat-treating in such a manner that the sheets will be subjected to uniform temperature conditions practically throughout the period of actual heat treatment.

Another object of my invention is to provide a novel apparatus for treating steel sheets of such a form that it will grasp the sheets of steel as presented and conduct them through a furnace wherein they are subjected to proper and uniform temperature conditions throughout their entire area and which will then deliver the sheets in a manner to facilitate the ready handling thereof.

Another object of my invention is to provide an apparatus for treating sheets of steel which is of such structure and so adjustable as to render possible the treatment of sheets of steel of all sizes.

In accordance with my method, the sheets of steel are preferably fed successively on edge into the end of a furnace. As they enter the furnace, they are automatically grasped upon their upper edges by tongs which conduct them through the furnace without support from beneath. In other words, the sheets or plates of steel are not supported on their lower edges when they are in the furnace and are, therefore, free from any tendency toward bending or crumpling due to their weight while under high temperature conditions.

The apparatus which I preferably utilize for handling these sheets comprises an endless conveyer upon which the lower edge of each sheet is supported during movement toward the furnace. It also comprises an endless conveyer located above the furnace and having a series of tongs designed and operative to grasp successively each sheet as it approaches the furnace and to then pass into the furnace therewith, projecting downwardly through a slot in the top wall of the furnace during their travel through the furnace. The apparatus also preferably comprises an endless conveyer for receiving each sheet as it leaves the furnace and gradually lowering it into horizontal position.

The preferred embodiment of my invention is shown in the accompanying drawings wherein similar characters of reference designate corresponding parts and wherein.

Figure 1:
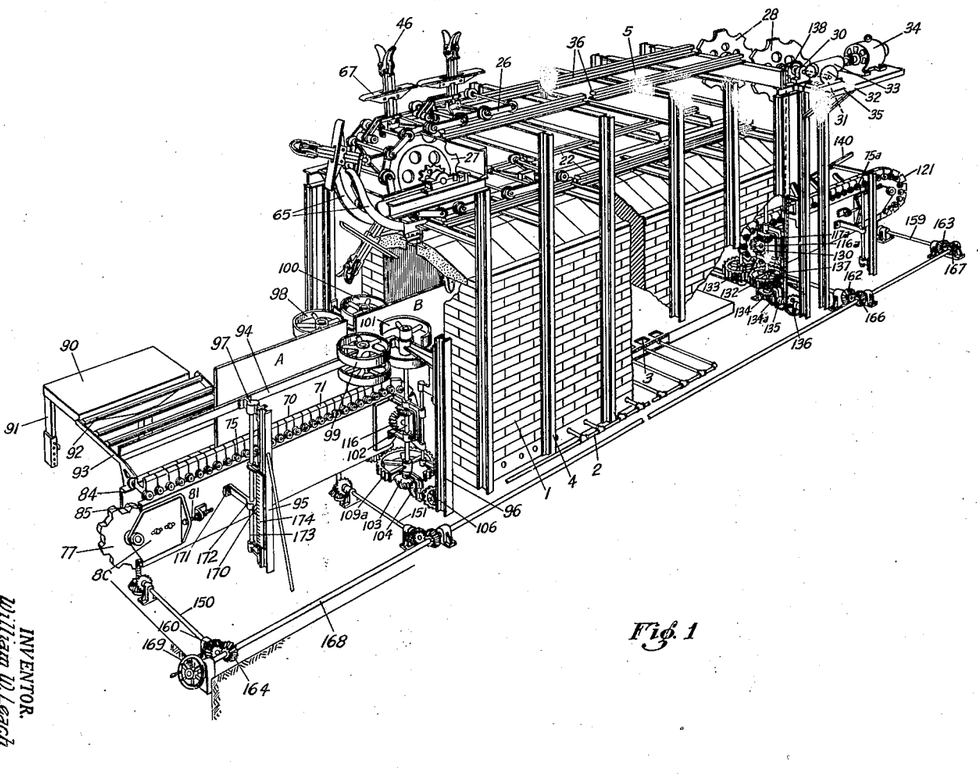
Figure 1 is a perspective view of the apparatus which I preferably utilize in performing my method.
Figure 2:
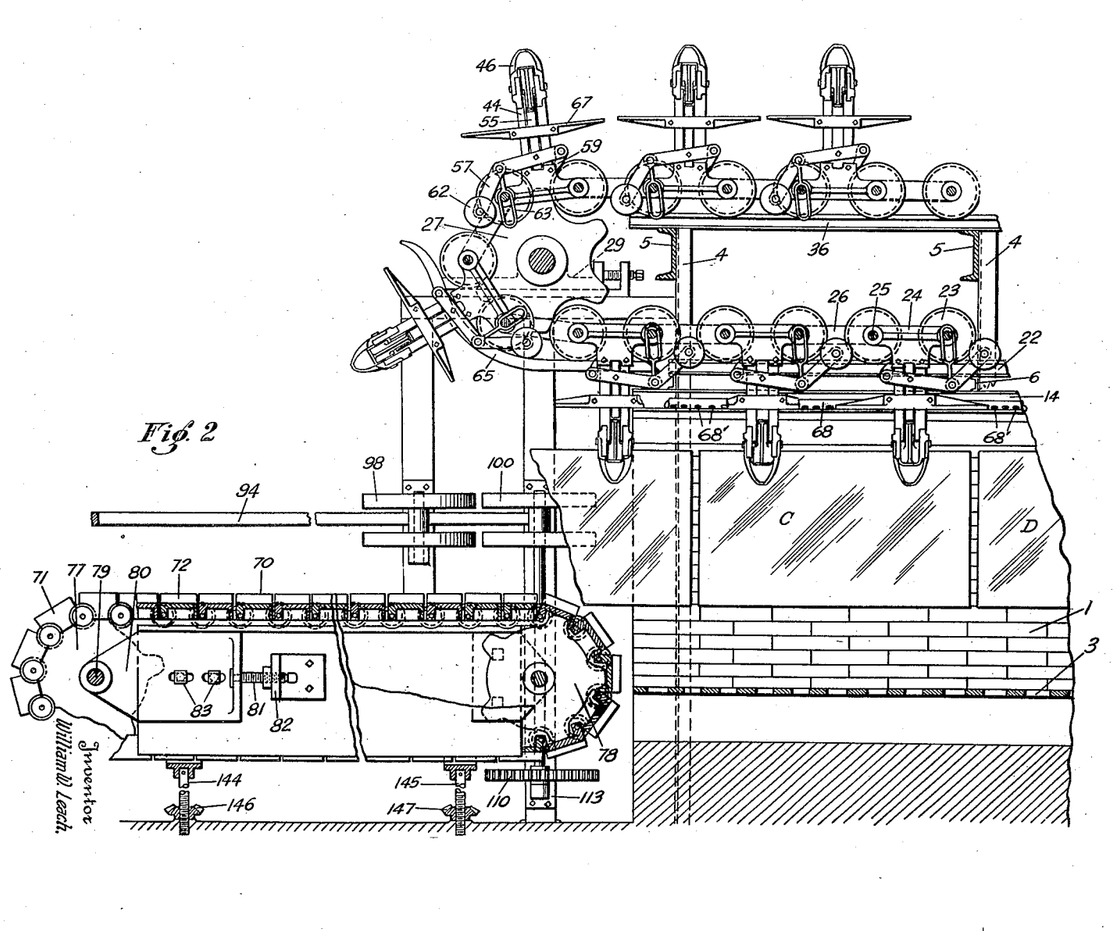
Figure 2 is a vertical longitudinal section of the receiving end of a furnace built in accordance with my invention, and showing the conveyer which conducts the sheets to the furnace together with the tong-carrying conveyer which receives these sheets and conducts them into the furnace.

Referring more particularly to the drawings, my invention is shown as comprising a furnace 1 which may be equipped with a plurality of pipes 2 adjacent the base thereof for conducting gas or other fluid fuel to burners which may be located as indicated at 3 in Figures 1 and 2. This burner structure may be of checker-like form and is preferably disposed well below the level of the lower edges of the sheets or plates of steel which are to be conducted through the furnace, so that these sheets or plates may be subjected to high-temperature conditions without the direct application of flame thereto.

Figure 6:
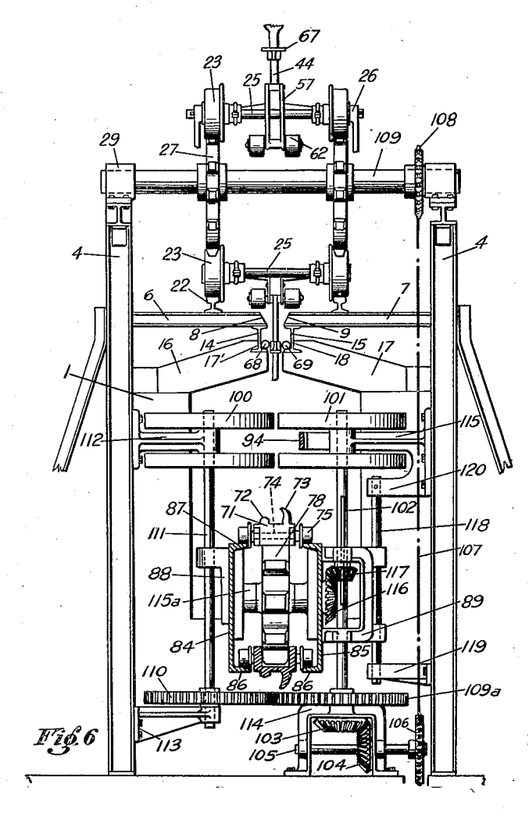
Figure 6 is a section taken on line 6—6 of Figure 4.
Figure 7:
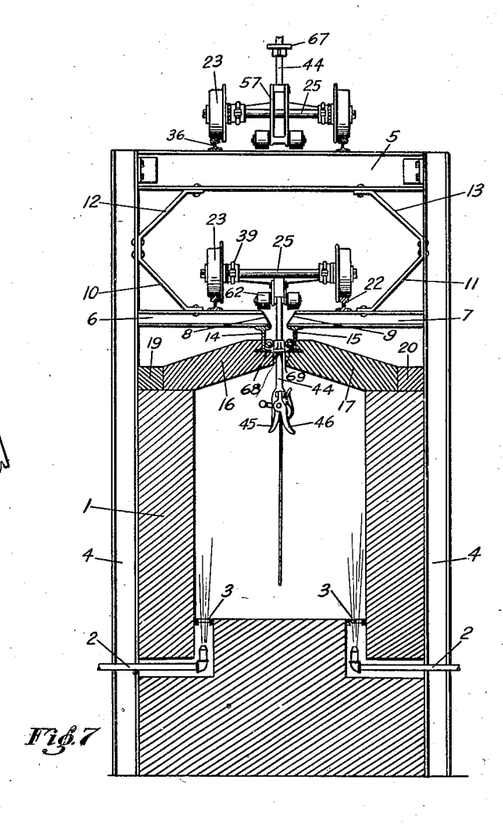
Figure 7 is a section taken on line 7—7 of Figure 4.

As illustrated best in Figures 1, 6 and 7 of the drawings, the furnace is supported by I-beams 4 which are vertically disposed and arranged in spaced relation and which form parts of a rectangular framework embodying top cross-pieces 5 which are horizontally disposed so as to join opposing vertical I-beams 4. Disposed in alignment with each other and in parallel relation with the cross-beams 5 at a substantial distance therebelow, I preferably provide smaller I-beam members 6 and 7 whose outer ends are secured to the vertical I-beams 4 and whose inner ends are beveled as at 8 and 9 and spaced apart. Diagonal braces 10 and 11 extend between the upper flanges of the I-beams 6 and 7 and the inner flanges of the vertical I-beam 4, being secured to such members 4, 6 and 7 in any desired manner. These diagonal braces cooperate with diagonal braces 12 and 13, which may be formed integrally therewith and which extend from the vertical I-beams 4 to the channel beams 5, being secured in any desired manner to both of these members.

The series of I-beam members 6 and 7 are preferably disposed at spaced regular intervals throughout the length of the furnace and their inner ends support longitudinal members 14 and 15 which extend throughout the length of the furnace and are arranged in spaced relation to each other. The top of the furnace may be constructed of a plurality of slabs 16 and 17 whose inner ends are cut away as at 17' and 18 to fit over the lower flanges of these members 14 and 15. These slabs may be removably held in the position shown in Figure 7 by means of clay blocks or bricks 19 and 20 which brace the outer edges of the slabs so as to space them away from the vertical I-beams 4 and hold their cut away portions in embracing relation to the lower flanges of the longitudinal I-beams 14 and 15. This produces a simple top structure with a slot throughout its length through which the tong members are designed to project. Furthermore, it produces a structure wherein the top slab may be readily removed and replaced in the event of breakage or in the event that it is necessary to make repairs within the furnace. As a matter of fact, it is feasible to remove and replace these slabs while the heat is still retained within the furnace.

Figure 3:
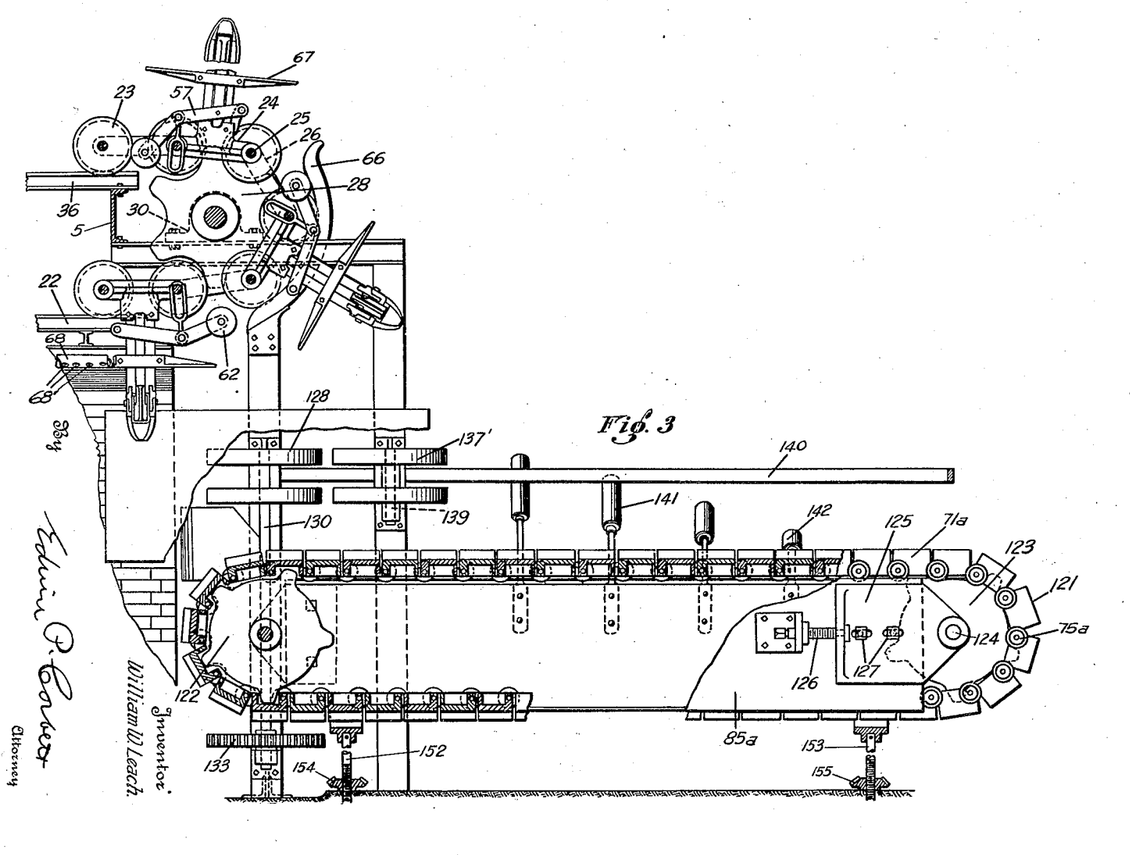
Figure 3 is a longitudinal section of the delivery end of a furnace and showing the delivery end of the tong-carrying conveyer as well as the conveyer which receives the sheets or plates of steel after they leave the furnace and guides them into substantially horizontal position.

The spaced I-beam members 6 and 7 are designed to support rails 22 which are adapted for the reception of the wheels 23 of the tong supporting members 24, which are best illustrated in Figure 3. These tong-supporting members carry axles 25 upon which the wheels 23 are mounted and through which the tong-supporting members are joined by means of links 26 to form an endless tong carrier made up of a number of spaced tong-supporting members and such links.

These endless carriers extend about spaced pairs of driving wheels or sprockets such as shown at 27 and 28 in Figure 1. These sprockets 27 are idly mounted in bearings 29 while the sprocket members 28 are mounted in bearings 30, but are adapted to be positively driven through the medium of a shaft 31 carrying a worm gear 32 and adapted to be driven by a worm 33 directly connected to the rotor shaft of a motor 34. This motor may be mounted upon the apparatus in any manner as, for instance, by means of a shelf 35.

The upper portion of the tong-supporting conveyer is disposed in parallelism with the lower portion thereof and the wheels of the tong carriages are designed to run upon the spaced rails 36 which are mounted upon the channel beams 5. It will be readily understood that, when the tong-supporting members have their wheels 23 riding upon the spaced rails 22, the tongs thereof are disposed in depending relation thereto and project downwardly through the slot in the top of the furnace and into the position which they assume when carrying the sheets or plates therethrough. When these tong-supporting members have their wheels riding upon the rails 36, the tongs thereof are projecting directly upward from these tong-supporting members.

Figure 5:
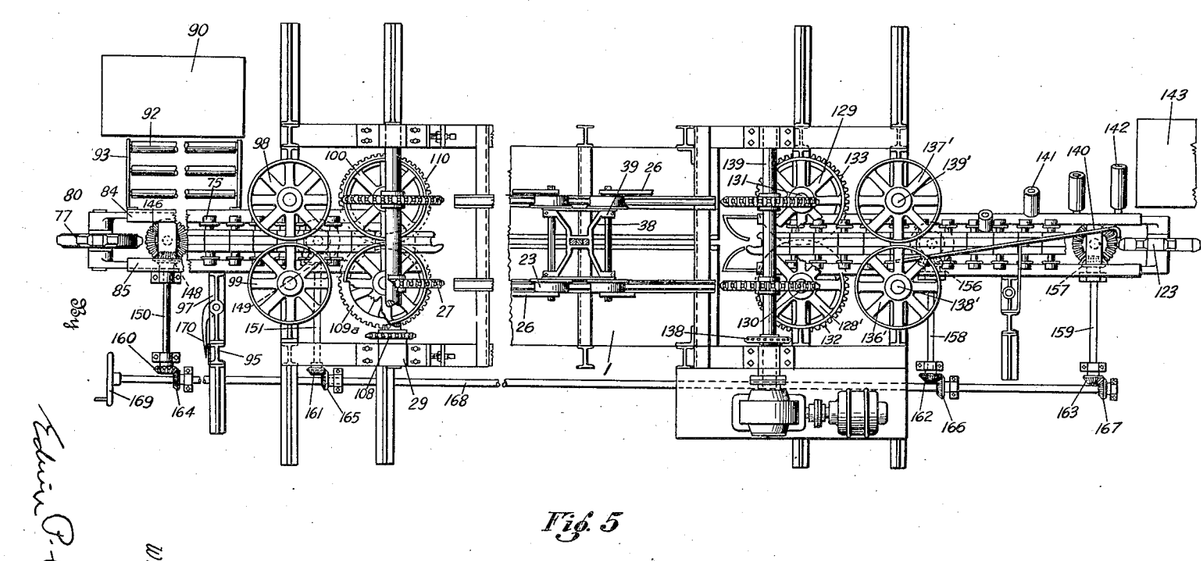
Figure 5 is a top plan view of the structure shown in Figure 4.
Figures 8, 9:
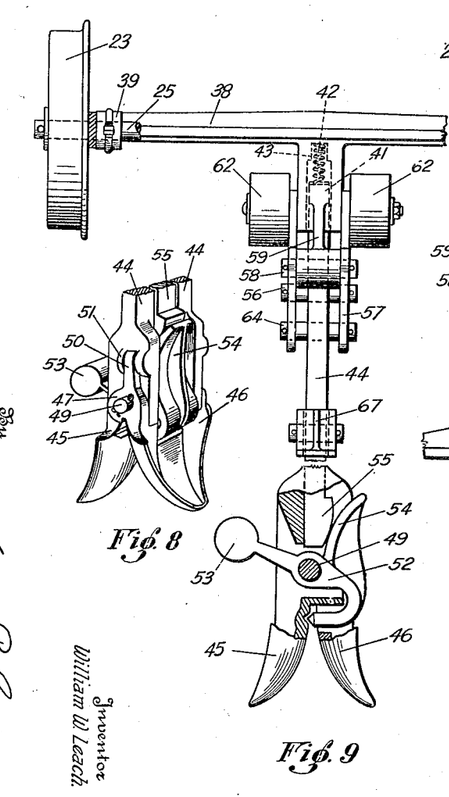
Figure 8 is a perspective view of a portion of one of the tongs which I may utilize in my invention for supporting the sheets while they are being carried through the furnace.
Figure 9 is an end elevation, partially broken away, of my tong-conveyer.
Figures 10, 11:
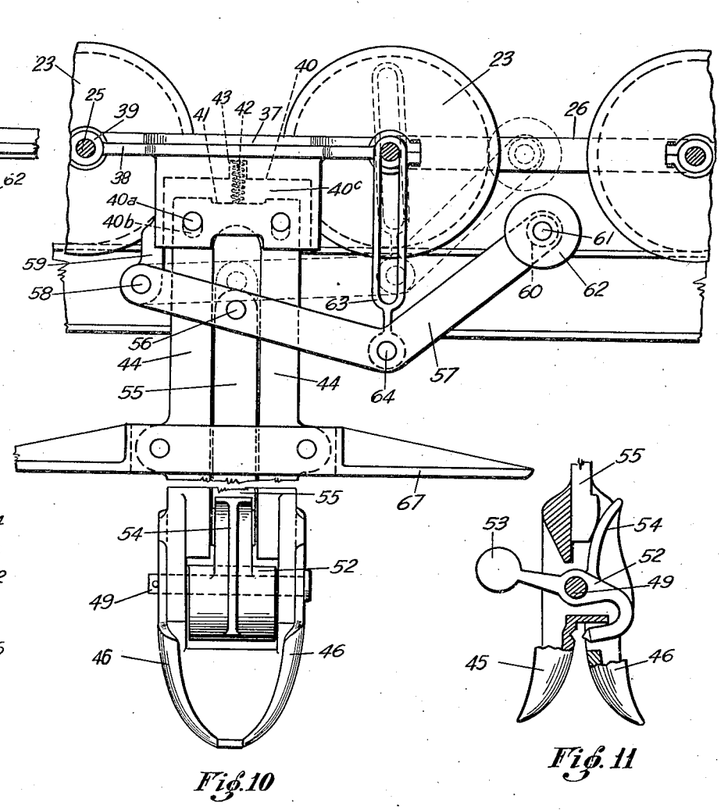
Figure 10 is a side elevation of a portion of my tong-conveyer.
Figure 11 is a detail, partially broken away, of one of the tong members such as shown in Figures 8, 9 and 10.

Each tong-supporting carriage is of rectangular form as illustrated in Figures 9 and 10 and comprises side members 37 which are spaced apart by means of a spider-like framework 38, as shown in Figure 5. This spider-like framework is provided with four arms whose extremities carry bearings 39 integrally formed thereon for the reception of the axles 25 previously referred to. It has already been pointed out that the links 26 connect the axles of adjacent tong-supporting carriages and thereby produce an endless carrier of which the tong members form a part.

Each spider-like framework is provided with a socket 40 of rectangular form disposed centrally thereof and adapted for the reception of a tong member. These tong members are each shown, in Figures 8 to 11, as comprising a base 41 designed to be mounted in the socket 40 by bolts 40a and slots 40b and to be normally forced outwardly by means of a coil spring 42 seated in a socket 43. The base 41 has, integrally formed thereon, spaced leg members 44 which are joined at their outer extremities by an integral jaw member 45 which forms a part of the tong. Complementally mounted upon this integral jaw member 45 is a jaw member 46 having spaced perforated ears 47 which straddle the jaw member 45, as shown in Figure 8, and are held in position therein by means of a cross-pin 49. These ears 47 are each further provided with integral upstanding lugs 50 which project snugly into a space provided between two lugs 51 integrally formed on the sides of the jaw member 45. When these parts are assembled, the jaw members 45 and 46 are held immovable with relation to each other.

It should be noted that the opposing faces of the jaw members 45 and 46 are rounded to produce a throat which flares outwardly toward the outer extremities of the jaw members and which flares laterally toward the side edges thereof. This ensures that the sheets or plates which are designed to enter these jaw members will be guided readily into this flared throat, regardless of whether the horizontal or vertical edges of the sheets or plates first contact with these jaw members.

Each pair of jaw members is supplemented by a gripping hook such as shown at 52 in Figures 8 to 11, inclusive. This gripping hook is pivotally mounted upon the pin 49 and, when the tong member is in depending position, it would normally be held in inoperative position by its weighted end 53 but for the provision of a means effective during the actual passage of the tongs into and through the furnace for forcing the gripping hook into operative or gripping position.

The means for forcing such gripping hook into operative or gripping position comprises a cam-like lug 54 integrally formed upon the hook 52 and designed for cooperation with a cam-like plunger 55 which is reciprocably mounted in between the legs 44 of the tong structure. This plunger 55 is connected at its upper end as at 56 with a weighted lever framework 57 of angular form. The lever framework 57 is fulcrumed as at 58 upon a pin mounted in an ear 59 integrally formed upon the spider-like framework 38. The lever framework 57 extends in the same direction as the path of travel of the tong members and straddles the legs 44 of these tong members, being connected to the upper end of the plunger 55 by the cross-pin 56, previously described. The outer extremities of the legs of the lever framework 57 are joined by a sleeve 60 which may be integrally formed therewith and which serve as a support for an axle 61 upon whose opposite ends are provided weight rollers 62. The two positions alternately assumed by this lever framework are illustrated in Figure 10 and it is shown in this figure that each lever framework is equipped with a yoke 63 pivotally connected thereto as at 64 and embracing one of the axles of a tong carriage to assist in guiding the lever framework between its various positions.

From this description it will be understood that, when the lever framework is in the lower position, as indicated in full lines in Figure 10, the lever framework is effective to force the cam plunger 55 downwardly against the cam lug 54 to force the gripping hook 52 into operative or gripping position. Means is provided, as will subsequently be described, to restrain this action of the lever framework until the desired instant.

It will be understood that, when the tong members are traveling along the upper tracks 36 and, in fact, throughout the time when they are disposed in upwardly extending positions the weighted lever framework will serve to withdraw the cam plungers 55 from actuating relation to the lugs 54. However, when they approach the receiving end of the furnace and start to turn downwardly, as illustrated at the left hand end of Figure 2, the weighted lever framework would, unless restrained, begin to force the cam plungers 55 against the cam lugs 54 so as to close the gripping member. In order to preclude this until the proper time has arrived, I have provided spaced cam tracks 65 (see Figures 1 and 2) which intercept and support the rollers 63 until the sheets or plates of steel are well within the throat of each tong member, which occurs immediately before each tong member has entered the furnace. Therefore, this pair of cam tracks terminates at about the entrance to the furnace.

As the weighted rollers of each lever framework pass beyond the cam tracks 65, they drop downwardly with the result that the cam plunger exerts pressure upon the cam lug 54 and causes the gripping hook 52 to grip the sheet of steel with sufficient force to support it by suspension and without support from beneath. Thus, the sheets of steel are carried through the furnace until they reach the delivery end, as illustrated in Figure 3.

In connection with the mounting of the tong members in their sockets 40, it will be noted that there is a clearance at the sides thereof as at 40c and that a clearance at the top thereof is ensured by the spring 42. These clearances in conjunction with the slots 40b for the bolt 40a permit the tong members to swing in the direction of travel of the sheets to compensate for contractions and expansions of these sheets as a result of temperature change.

As each tong member emerges from the furnace as shown in Figure 3, the weighted rollers 62 of its lever framework ride upwardly upon a pair of cam tracks 66 which lift the lever framework sufficiently to elevate the cam plunger and release the gripping hook. It will be understood, of course, that upward movement beyond this track ultimately turns each tong member into such a position that the lever framework thereof will drop down and remove the cam plunger from operative pressure upon the cam lugs 54.

Each tong member is provided at a point substantially intermediate its length with a plate 67. These plates are preferably of long and narrow forms and, as illustrated in Figures 2 and 7, their ends are closely juxtaposed. Furthermore, they are mounted at such a height upon the shank of each tong member that they substantially close the gap between the lower flanges of the I-beams 14 and 15. In other words, they substantially close the longitudinal slot in the top of the furnace. They are not, however, relied upon solely to prevent the escape of heat from the furnace but, in this respect, are supplemented by pipes 68 and 69 disposed immediately above the lower flanges of the I-beams 14 and 15 and within the space between such I-beams, as illustrated in Figures 6 and 7. These pipes 68 and 69 are provided upon their under surfaces, as illustrated in Figures 2 and 3 with ports 68' and the pipes are designed to be fed with air or other cooling fluid so that streams of air of any selected temperature and pressure may be projected against the slot in the top of the furnace to preclude the escape from the furnace of an undue amount of heat. These streams of cooling medium also serve to cool the shanks of the tong members and to preclude the conduction of an undue amount of heat upwardly through the carriages of the tong members.

The sheets or plates of steel are fed into position for gripping by the tong members by means of an endless conveyer 70 (see Figures 1 and 2). This endless conveyer is preferably made up of a plurality of supporting members 71 (see Figure 6) whose upper surfaces are provided with upstanding short flanges 72 along the edge thereof and upstanding long flanges of bent form 73 disposed along the opposite edge thereof. These supporting members 71 carry axles 74 at the ends thereof for the reception of wheels or rollers 75. The axles of adjacent supporting members connect these members so that a complete endless carrier is formed. As illustrated in Figure 2, the endless carrier runs over sprockets 77 and 78, whose teeth are spaced a sufficient distance apart so that a supporting member and a pair of axles may fit between each pair of teeth. The sprocket 77 is mounted upon a shaft 79 carried upon a plate structure 80. This plate structure is adjustable by means of a screw 81 operating in a flange member 82 and may be secured in position by means of bolt and slot structure 83.

By reference to Figures 1 and 6, it will be seen that this endless carrier structure embodies spaced I-beams 84 and 85 with their flanges inwardly turned to produce a pair of tracks 86 for the wheels 75 of the lower strand of the conveyer and a pair of tracks 87 for the upper strand of the conveyer. The sprocket members 77 and 78 are likewise supported ultimately upon these I-beams. The I-beam 84 is in turn supported upon a bracket 88 while the I-beam 85 is supported upon a bracket 89. This produces a compact conveying structure which may be vertically adjusted as a unit. The means for effecting this vertical adjustment will be described subsequently.

Furthermore, the I-beam 84 carries a table member embodying a flat substantially horizontal table 90 whose outer edge is supported by legs 91 and whose inner edge is connected to an inclined roller framework which is in turn connected to the I-beam 84. This roller framework preferably comprises spaced parallel rollers 92 whose ends are journaled in metal strips 93. This entire structure, being secured to the I-beams 84, is vertically adjustable therewith and the legs 91 may be adjustable in any desired manner to compensate for raising and lowering of the table.

For cooperation with this conveyer structure, I have provided a horizontal metal strip 94 spaced a substantial distance above the conveyer and extending in parallelism therewith for substantially the entire length thereof. This strip is disposed in such relation to the conveyer that it will assist in maintaining the sheets or plates of steel in upright position while they are being conveyed toward the furnace. This strip is supported by vertical I-beams 95 and 96 through the medium of intermediate brackets, such as shown at 97.

Further cooperating with this conveyer, are two pairs of idly rotatable wheels 98 and 99 disposed on opposite sides of the path of travel of the sheets or plates of steel. These rollers are normally out of contact with the sheets or plates of steel and merely serve to prevent the leaning of such sheets. The peripheries of these rollers are preferably of soft material to preclude scratching of the sheets. Likewise, I have provided a pair of positively-driven rollers upon each side of the path of travel of the sheet in between the rollers 98 and 99 and the entrance to the furnace. These positively-driven rollers may be designated 100 and 101.

As shown in Figure 6, the rollers 101 are rigidly secured to a vertical shaft 102 which is provided at its lower end with a beveled gear 103 rigidly mounted thereon. This beveled gear 103 is enmeshed with a beveled gear 104 on a horizontal shaft 105. Mounted on this horizontal shaft 105, is a sprocket 106 which is designed to be driven by a sprocket chain 107 which is, in turn, driven by a sprocket 108 on the shaft 109 to which the sprockets 27 are rigidly secured. The shaft 102 also carries, in a plane below the level of the conveyer unit, a horizontally disposed gear 109$^a$ which is enmeshed with a horizontally disposed gear 110 rigidly secured to a vertical shaft 111 adjacent the lower end thereof. This shaft 111 is the shaft upon which the rollers 100 are rigidly mounted and it is supported in brackets 112 and 113 which are secured to the inner side of one of the vertical I-beams 4. The vertical shaft 102 is supported at its base by means of a U bracket 114 and is supported adjacent its upper ends by means of a bracket 115 extending inwardly from and mounted upon the vertical I-beam 4.

The conveyer element for conducting the sheets or plates of steel to the furnace is driven through the medium of the sprocket 78. This sprocket 78 is rigidly secured to a shaft that is mounted in bearings 115$^a$. At one end, this shaft projects through the I-beam 85 and carries a beveled gear 116 which is enmeshed with a beveled gear 117 splined upon the shaft 102 and supported in proper relation to the beveled gear 116 by the bracket member 89. This bracket member 89 carries one side of the vertically adjustable conveyer unit, inasmuch as it is secured to the I-beam 85. This conveyer unit is supported on its other side by the L-shaped bracket 88. This bracket 88 is vertically slidable upon the shaft 111 and the bracket 89 is slidably supported upon a rod 118 carried at its lower end in a bracket 119 secured to an I-beam 4 and at its upper end to an extension 120 of the bracket 115. It will be seen from this description that the conveyer unit, though positively-driven from the shaft 102, is vertically adjusted thereon. The means for accomplishing this will be described subsequently.

Figure 4:
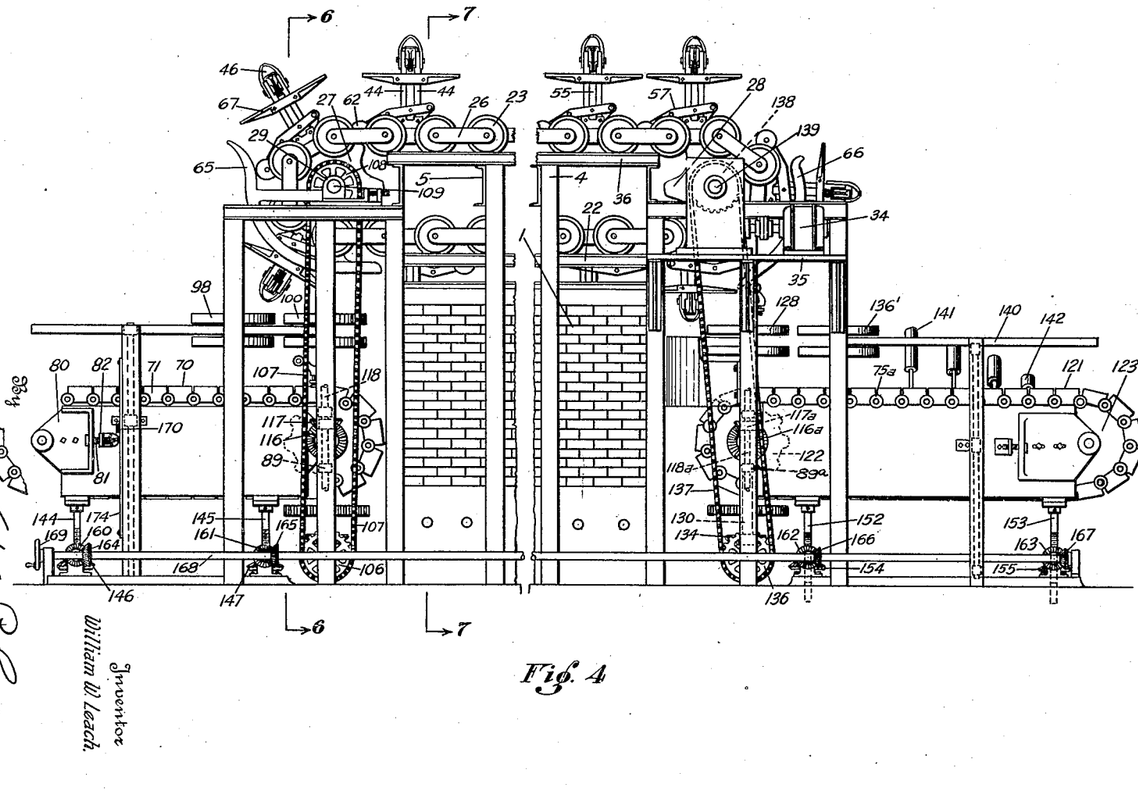
Figure 4 is a side elevation of my furnace and the apparatus complemental thereto, partly broken away.

I have also provided a means for taking the sheets or plates of steel as they emerge from the furnace in vertical position, conveying them to a position entirely outside of the furnace and then lowering them into horizontal position. This means is best shown in Figures 3, 4 and 5 and it comprises a conveyor 121 formed substantially the same as the conveyer 70 and extending around sprockets 122 and 123, the sprockets 123 being idly rotatable upon a shaft 124 which is carried upon a plate 125 which is adjustable by means of a screw 126 and which may be locked in adjusted position by means of blots and slots 127.

Immediately adjacent the delivery end of the furnace, are spaced pairs of rollers 128 and 129 which are disposed on opposite sides of the path of travel of the emerging sheets of steel in a position to prevent leaning of such sheets but out of contact therewith. The peripheries of these rollers are also preferably of soft material to ensure against scratching of the sheets. The rollers 128 are rigidly secured to shafts 130 and the rollers 129 are rigidly secured to shafts 131. Adjacent the lower end of these shafts are intermeshing gears, one upon each shaft, as illustrated at 132 and 133. The lower end of the shaft 130 has a beveled gear 134 rigidly secured thereon and this beveled gear is enmeshed with a beveled gear 134ᵃ on a horizontal shaft 135. Rigidly secured to the horizontal shaft 135, is a sprocket 136 which is designed to be driven by a sprocket chain 137 from a sprocket 138 carried upon the shaft 139 upon which the sprocket gear 28 is rigidly mounted.

The conveyer 121 may be driven in substantially the same manner as the conveyer member 70. The mechanism for effecting this driving action is best shown in Figure 1 of the drawings. By inspection of this Figure 1, it will be seen that the conveyer unit embodies spaced I-beams which are substantially identical with the spaced I-beams 84 and 85 of the front conveyer. One of these I-beams may be designated 85ᵃ. The conveyer 121 is made up in the same manner as the conveyer 70, being constructed of supporting members 71ᵃ which are linked together and provided with axles for the reception of wheels 75ᵃ.

The conveyer 121 is driven through the medium of the sprocket 122 by means of a bevel gear 116ᵃ mounted on the shaft of this sprocket 122, which bevel gear is in mesh with a bevel gear 117ᵃ splined upon a shaft 130 supported in proper relation to the bevel gear 116ᵃ by the bracket 89ᵃ. This bracket 89ᵃ is vertically slidable upon the shaft 130 and is guided by a rod 118ᵃ. It will be seen from this description that the conveyer unit, although positively driven from the shaft 130 is vertically adjustable thereon. The means for driving the shaft 130 is substantially identical with the means for driving the shaft 102. For example, it comprises a bevel gear 134 on the lower end of the shaft 130 which meshes with a bevel gear 134ᵃ, on a horizontal shaft which also carries a sprocket 136. This sprocket 136 is designed to be driven by a sprocket chain 137 which is in turn driven by a sprocket 138.

Complemental to the pairs of rollers 128 and 129, are pairs of rollers 136' and 137'. These rollers are likewise disposed in pairs on each side of the path of travel of the sheet, being out of contact with such sheets but in such proximity thereto as to prevent leaning of the sheets without marking them. The peripheries of the rollers are also preferably of soft material to ensure against scratching of the sheets. These rollers 136' and 137' are preferably idly rotatable upon vertical axles 138' and 139' which may be supported by brackets from one of the I-beams 4.

Immediately beyond these rollers 136' and 137' I have provided a strip of metal 140 which is disposed a substantial distance above the upper strand of the conveyer 121 and preferably in parallelism thereto. This strip of metal extends obliquely across the longitudinal center line of the conveyer 121 so as to assist in guiding the plates or sheets of steel toward one side of the conveyer. At this side of the conveyer I have provided a series of rollers 141 which are so mounted that each successive roller is inclined somewhat further away from the vertical and with the final roller almost in horizontal position, as shown at 142. The combined effects of this strip 140 and these rollers 141 and 142 is to take the sheets or plates as they emerge from the rollers 136' and 137' and gradually tilt them or permit them to tilt until they are in substantially horizontal position. In this position, they are fed onto a table such as shown at 143.

It is possible by my process and apparatus to treat sheets or plates of steel of varying sizes. In order to facilitate this, I have provided a means for raising or lowering the conveyer 70 and its associated parts and for simultaneously raising or lowering the conveyer 121 and its associated parts. This is accomplished by means of a series of vertical jack screws. Thus, the vertical jack screws 144 and 145 support the conveyer unit 70 and are provided adjacent their bases with beveled gears 146 and 147. These beveled gears 146 and 147 mesh with beveled gears 148 and 149 upon horizontal shafts 150 and 151 which extend outwardly in a lateral direction from the line of the conveyer.

A similar condition exists with respect to the conveyer unit 121. This conveyer unit is supported by vertical jack screws 152 and 153. These vertical jack screws are provided adjacent their lower ends with beveled gears 154 and 155 which mesh with beveled gears 156 and 157 on laterally extending horizontal shafts 158 and 159.

The laterally extending horizontal shafts 150, 151, 158 and 159 are provided on their outer extremities with beveled gears which are respectively numbered 160, 161, 162 and 163. These last-named beveled gears are enmeshed with gears 164, 165, 166 and 167 which are rigidly secured to a shaft 168. This shaft is provided with a hand wheel 169. It will be apparent that, by rotating the hand wheel 169 in one direction, the conveyer unit, both at the receiving and delivery ends of the furnace, may be raised to the same extent while rotation of this hand wheel in the opposite direction will lower both of these conveyer units and their associated parts simultaneously.

A means for indicating the adjustment of these conveyer units is shown best in Figure 1. In the form shown, a pointer 170 is carried upon the conveyer unit 70 by means of an L-shaped bracket 171 which is further provided with an apertured lug 172 designed to ride upon a guide rod 173. This guide rod is carried upon a vertically disposed I- beam 95 and this I-beam also carries a calibrated plate 174 with which the pointer 170 cooperates. By means of this adjusting structure, and the indicating mechanism just described, it is possible to readily adjust the conveying units at both the receiving and delivery ends of the furnace so that they will be at a proper level for any given type of sheets or plates which is to be fed to the successively presented tongs. In this manner, when it has once been determined what height plates are to be treated, it is merely necessary to adjust the conveying units so that the upper edges of these sheets will be at a proper level to be readily and effectively grasped by the tongs. The calibrations may be so arranged and of such a nature as to permit of the proper adjustment before the plates of steel are introduced on to the conveyer which delivers them into the receiving end of the furnace.

In operation the conveyer units are adjusted to a proper height for the sheets or plates of steel to be treated and the machine set in motion. Each plate is first preferably placed upon the table 90 and then caused to slide downwardly over the rollers 92 until its lower edge is supported upon the conveyer 70. The upstanding flanges 73 will effectively prevent the plate from passing across the conveyer and will guide the lower edge of this plate into proper position on the conveyer. The plate may then be lifted into vertical position with one side in proximity to the strip 94. In this position, the conveyer will carry the sheets in between the spaced rollers 98 and 99 and the rollers 100 and 101, preferably in the position of the sheets indicated at A and B in Figure 1.

As these sheets travel toward and into the furnace, they are successively straddled by the tongs and the specially contoured throat of each tong fully seats upon the upper edge of the sheet. During this initial seating action, the gripping hook 52 of each tong member is held open under the influence of its weight 53 and due to the fact that the lever framework is being held in uppermost position by the action of the spaced tracks 65 upon the roller weights 62 with a consequent maintenance of the cam plunger 55 in raised position. Continued progression of the sheet and the tong traveling therewith results in the passing of the roller 62 off the track 65 and the dropping of the lever framework with a consequent forcing of the cam plunger 55 against the cam lug 54 and a resultant gripping of the sheet by the gripping hook 52.

Shortly after this action occurs, the plate leaves the conveyer 70 and passes into the furnace in the manner shown at C and D of Figure 2. In this position it will be apparent that the plates are entirely supported from their upper edges by means of the tong members and their lower edges are unsupported from beneath. Furthermore, these lower edges are spaced a substantial distance above the flames by which the furnace is being heated. These sheets are thus successively carried through the furnace with practically their entire surfaces exposed to uniform heat and with no danger of bending or crumpling of the sheets under the high temperature conditions.

As these sheets or plates of steel emerge from the furnace, the weight roller 62 of each tong member rides upwardly upon the spaced tracks 66 immediately after these plates have passed, at least partially, onto the conveyer 121. The riding of these rollers 62 upon the tracks 66 serves to lift the cam plunger of each tong member successively and to thereby permit the gripping hook of each tong member to release the sheet.

The sheets, as they are thus released, are conducted by the conveyer 121 in between the strip 140 and the series of rollers 141 and 142. As this operation progresses, each sheet is gradually lowered on to its side and then delivered in substantially horizontal position upon the table 143.

In the modification shown in Figures 12 to 16, inclusive, it will appear that the conveyer which conducts the parallel rows of metal sheets or plates to the tong conveyer comprises a plurality of units 180 connected together by links which need not be shown and mounted upon rollers 181. Each of these units 180 is provided with a socket 182, and a socket 183.

The inner wall 184 of the socket 182 is higher than the outer wall 185 thereof. The outer wall 186 of the socket 183 is higher than the inner wall 187 of this socket. Furthermore, the wall 186 is higher than the wall 184.

Figures 15, 16:
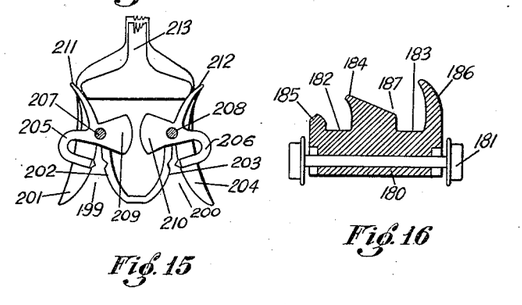
Figure 15 is a detail, in section, of a novel form of tong member which I preferably use in the handling of two rows of metal sheets or plates.
Figure 16 is a detail, in section, illustrating one of the units of the conveyer which I preferably utilize in delivering a plurality of rows of metal sheets or plates to my tong conveyer.

In applying the sheets, they are passed onto the conveyer from the left side (see Figures 16). The sheet which is to be placed in the socket 183 has its lower edge at a proper elevation so that it will pass over the walls 185, 184 and 187 and will be stopped by the wall 186, after which this sheet may be moved into upright position with its lower edge resting into the socket 183. The relatively low height of the wall 184 of the units facilitates the passing of the first sheets thereover. After this, the left hand sheets are passed over the walls 185 and their edges contact with the walls 184 of the units and are thereby guided into the sockets 182 of these units.

Figure 12:
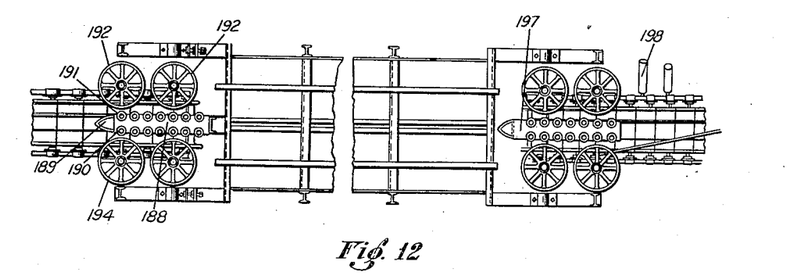
Figure 12 is a plan view illustrating, more or less diagrammatically, a modified form of my structure whereby I am enabled to treat two rows of sheets at one time.
Figure 13:
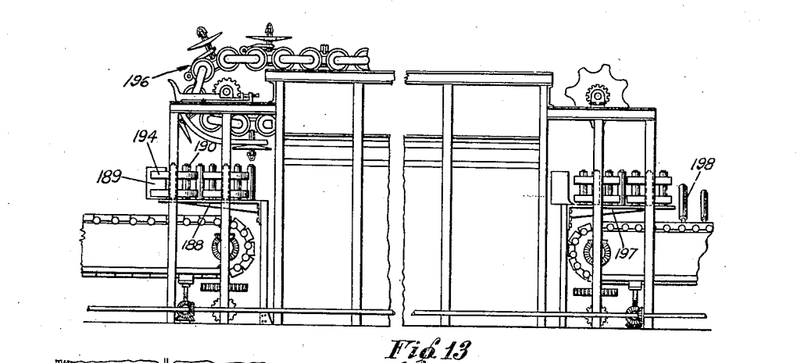
Figure 13 is a side elevation of the structure shown in Figure 12.
Figure 14:
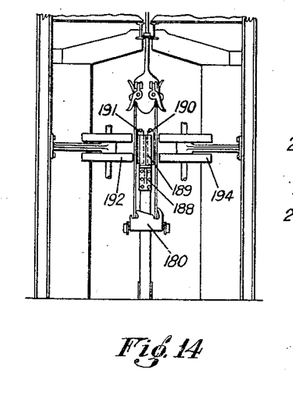
Figure 14 is an end view looking from the left of Figures 12 and 13.

With the metal sheets or plates arranged in this parallel relation, they are conducted by the conveyer on opposite sides of a central member 188. This control member 188 is provided with a rounded nose 189 which ensures the maintenance of the separated relation of the sheets and which guides them upon opposite sides of the member 188, as illustrated in Figure 12. Passing on opposite sides of this member 188, they pass between rows of vertical rollers 190 and 191 and sets of rollers 192 and 194, which rollers may be mounted and driven in the same manner as the rollers used in the preferred form.

After these plates or sheets pass the member 188, they are gripped by the tongs of the tong conveyer 196 and conducted through the furnace. When they leave the furnace, they are received by a conveyer which may be generally designated 197 and which operates substantially like the conveyer just described for conducting the sheets to the tong conveyor, being substantially identical in form with this conveyer and being supplemented by a means for gradually lowering the sheets upon their sides. This latter means is designated generally 198 and lays the sheets upon their side in superimposed relation in a manner that will be well understood.

The tong members which I utilize are provided with dual throats 199 and 200 and the walls of these throats are rounded as at 201, 202, 203 and 204, in substantially the manner illustrated and described in connection with the throats of the tong shown in Figures 8 to 11, inclusive. Each throat of this tong member is supplemented by a gripping member and these gripping members may be generally designated 205 and 206. They are respectively pivoted at 207 and 208 and are provided with weighted portions 209 and 210. They are also provided with cam-like extensions 211 and 212 which are designed for cooperation with a cam plunger 213 in a manner that will be well understood by reference to the operation of the tongs shown in the preferred form.

It will be seen that I have provided a novel process and apparatus for heat-treating, normalizing or enameling sheets of steel or other material. This process and apparatus have numerous advantages. For example, the sheets are so handled that they may be subjected to the proper temperature conditions throughout their entire area. No "dummy" plates are necessary and, therefore, there is no waste of material. It is not necessary to overlap the sheets and this further ensures a uniform treatment. The heat applied is applied equally upon all sides of the sheet. Furthermore, the tongs and the operating mechanism therefor are of such a nature that the sheets are gripped uniformly and effectively. Although a slot is provided in the top of the furnace, loss of heat from the furnace is fully guarded against both by means of the sliding plates and the fluid temperature controlling means. In addition, this temperature controlling means protects the upper portion of the tong structure and the conveyer parts of the furnace structure thereabove from overheating. Likewise, all necessity for the use of water-cooled shafts or other parts within the furnace and consequent impairment of efficiency is obviated.

Wherever the term "treating" is used in the description or in the claims of this application, this term is intended to include heat-treating, normalizing or enameling, any one of which operations may be performed with the aid of my method and apparatus.

Having thus described my invention, what I claim is:

1. The method of treating metal sheets which comprises conveying them to a furnace while supported in substantially upright position on their lower edges, and then conveying them through said furnace in suspension.

2. The method of treating metal sheets which comprises conveying them to a furnace while supported in a substantially upright position on their lower edges, conveying them through said furnace in suspension, and conveying them from said furnace while supported in a substantially upright position upon their lower edges.

3. The method of treating metal sheets which comprises conveying them through a furnace in suspension, and then conveying them from said furnace while supported in a substantially upright position upon their lower edges.

4. Apparatus for treating sheets of metal comprising a furnace, a conveyer, means on said conveyer for automatically grasping successively presented sheets of metal and conveying them through said furnace, means for automatically presenting said sheets to said conveyer, and mechanism for vertically adjusting said last-named means to present the sheets to said grasping means in proper position regardless of the size of said sheets.

5. Apparatus for treating sheets of metal comprising a furnace, a conveyer, means on said conveyer for automatically grasping successively presented sheets of metal and conveying them through said furnace, means for automatically presenting said sheets to said conveyer, means for automatically conveying said sheets away from said conveyer, and mechanism for vertically adjusting said last two means to compensate for variations in the size of said sheets.

6. Apparatus for treating sheets of metal comprising a furnace, a conveyer, means on said conveyer for automatically grasping successively presented sheets of metal and conveying them through said furnace, means for automatically presenting said sheets to said conveyer, means for automatically conveying said sheets away from said conveyer, and mechanism for simultaneously adjusting said last two means vertically to compensate for variations in the size of said sheets.

7. Apparatus for treating sheets of metal comprising a furnace, a conveyer, tong members carried by said conveyer and projecting into said furnace for movement therethrough, gripping means forming a part of said tong members for gripping the sheets of metal, and a weighted lever element for each gripping means, said weighted lever element being pivotally connected to said conveyer and operatively connected to said gripping means, said weighted lever element projecting substantially in the same direction as the path of travel of the sheets of metal.

8. Apparatus for treating sheets of metal comprising a furnace, a conveyer, tong members carried by said conveyer and projecting into said furnace for movement therethrough, gripping means forming a part of said tong members for gripping the sheets of metal, and a weighted lever element for each gripping means, said weighted lever element being pivotally connected to said conveyer and operatively connected to said gripping means said weighted lever element projecting substantially in the same direction as the path of travel of the sheets of metal, said weighted lever element having its weights divided substantially equally upon opposite sides of each tong member.

9. Apparatus for treating sheets of metal comprising a furnace, a conveyer, tong members carried by said conveyer and designed to embrace and suspend successively presented sheets of metal, said tong members having jaws on their lower ends with surfaces rounded to ride into position upon the upper edges of the metal sheets either at the corners thereof or intermediate the length thereof.

10. Apparatus for treating sheets of metal comprising a furnace, a conveyer, tong members carried by said conveyer and designed to embrace and suspend successively presented sheets of metal, said tongs provided with guiding throats whose walls are flared and rounded transversely and longitudinally.

11. Apparatus for treating sheets of metal comprising a furnace, a conveyer, tongs for supporting said sheets of metal in suspension and carrying them through said furnace, means for connecting said tongs to said conveyer said connecting means being automatically adjustable to compensate for expansion and contraction of the metal sheets.

12. Apparatus for treating sheets of metal comprising a furnace, a conveyer, tongs for gripping said sheets, and carrying them through said furnace, a socket on said conveyer, and a base on said tong adapted to fit into said socket in such a manner as to permit the said tong to swing in the line of movement of the metal sheets.

13. Apparatus for treating sheets of metal comprising a furnace, a conveyer, tong members carried by said conveyer and projecting into said furnace for movement therethrough, gripping means forming a part of said tong members for gripping the sheets of metal, a weighted arm integrally formed with said gripping means, said weighted arm normally rendering said gripping means inoperative, and a weighted lever element for engaging and operating said gripping means, said weighted lever element projecting substantially in the same direction as the path of travel of the sheets of metal.

14. The method of treating sheets of metal which comprises conveying them to a furnace while supported in a substantially upright position on their lower edges, automatically presenting said sheets to a conveyer which is adapted to automatically grasp successively presented sheets of metal and convey them through the furnace while suspending them in substantially vertical position with their lower edges unsupported, automatically releasing said sheets from said conveyer as they leave the furnace, and conveying them from said furnace while supported in a substantially upright position upon their lower edges and simultaneously lowering them upon their sides.

15. Apparatus for treating sheets of metal comprising a furnace, a conveyer, tong members carried by said conveyer and projecting into said furnace for movement therethrough, gripping means forming a part of said tong members for automatically gripping successively presented sheets of metal and conveying them through said furnace, said tong members having jaws on their lower ends with rounded surfaces adapted to ride into position upon the upper edges of the metal sheets, and means for automatically presenting said sheets to said conveyer.

16. Apparatus for treating sheets of metal comprising a furnace, a conveyer, tong members carried by said conveyer and projecting into said furnace for movement therethrough, gripping means forming a part of said tong members for automatically gripping successively presented sheets of metal and conveying them through said furnace, said tong members having jaws on their lower ends with rounded surfaces adapted to ride into position upon the upper edges of the metal sheets, means for automatically presenting said sheets to said conveyer, means for automatically releasing said sheets from said gripping member as they leave the furnace, and means for conveying them from said furnace while supported in a substantially upright position upon their lower edges and for simultaneously lowering them upon their sides.

17. Apparatus for treating sheets of metal comprising a furnace with a longitudinal slot in its top wall, a conveyer above said furnace, tong members carried by said conveyer and designed to project downwardly through the slot in the top wall in said furnace for conveying sheets of metal through said furnace, said tong members being adapted to grip said sheets of metal, means for preventing the escape of heat from said furnace through said slots, said means comprising plates carried on the shanks of said tong members for substantially closing said slot and means for applying fluid to said slot.

In testimony whereof I, hereby affix my signature.

WILLIAM W. LEACH.